March 11, 1941.  C. F. JOHNSON  2,234,434
VALVE
Filed Oct. 27, 1938
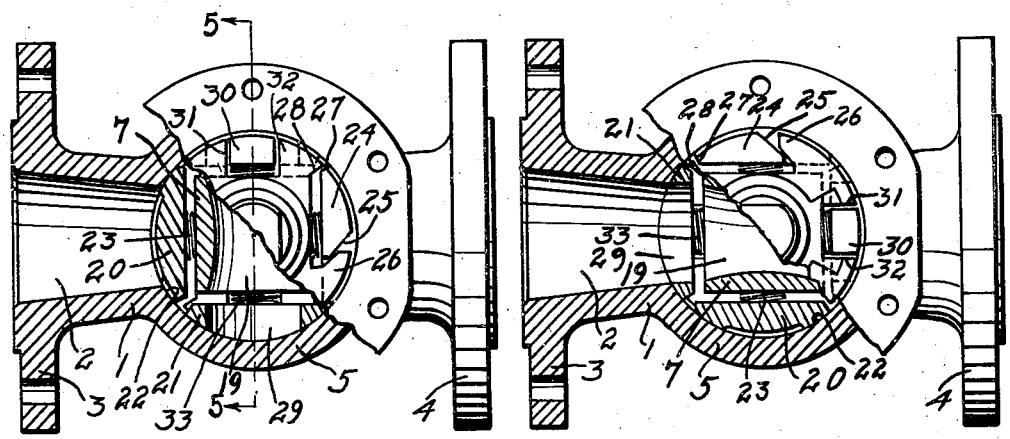
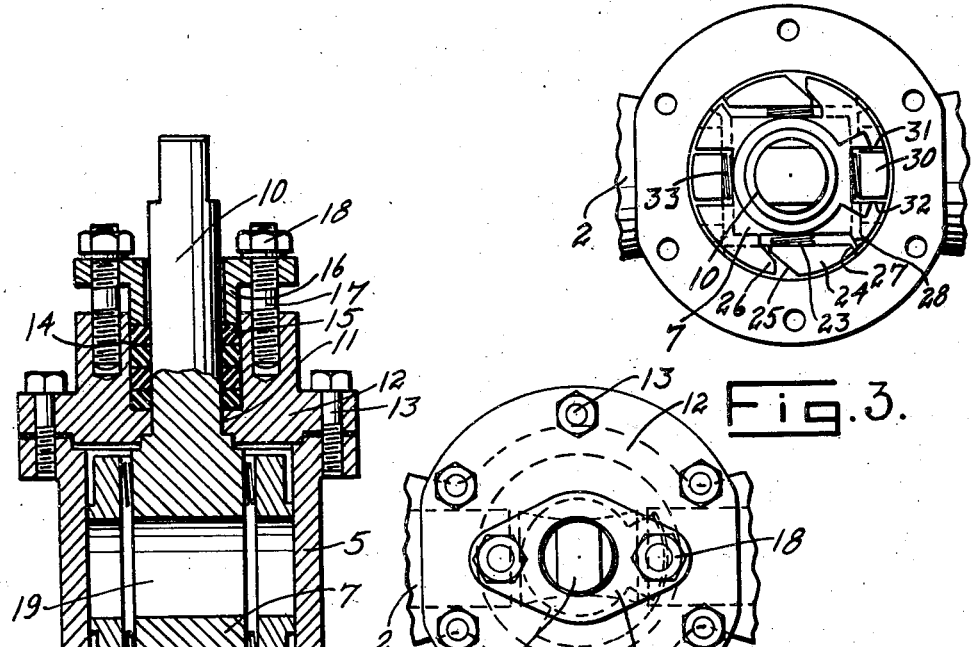
Inventor
C. F. Johnson.

UNITED STATES PATENT OFFICE 2,234,434

VALVE

Charles F. Johnson, Houston, Tex., assignor to Reed Roller Bit Company, Houston, Tex., a corporation of Texas Application October 27, 1938, Serial No. 237,187

4 Claims. (Cl. 251—102)

This invention relates to a valve and has for its general object the provision of a valve structure in which the seating surfaces of the valve members will at all times be protected against abrasion, erosion or corrosion.

The particular type of valve illustrated by way of example in the drawing forming a part of this application is generally speaking similar to that illustrated in the patent to Wynkoop, No. 1,995,491, although it is to be understood that this invention is not limited to that type of valve but may be used in numerous other types.

In the usual valve, closure members are provided for seating over and about the outlet and in some instances the inlet opening within the valve. These effect closure of the valve when they are moved to seat over these openings and permit flow through the valve when moved from such position. However, in the ordinary case, when the closure members are moved from their closed position, the surfaces against which they have been seating will become exposed to the fluid passing through the valve. In many instances such a fluid contains sand or other abrasive and perhaps acid or other corrosive matter. The seating surfaces, therefore, are at such times as the valve is open subjected to abrasive, erosive and corrosive action due to the nature and flow of fluid through the valve.

It is an object of this invention to provide for the protection of internal surfaces of a valve body and of the seating surfaces of the valve and valve body for both the open and closed positions of the valve so that no matter in which position the valve is disposed the important seating surfaces are protected from the above mentioned detrimental effects.

It is another object of this invention to provide a valve of the floating segment closure type in which the seating surfaces will be protected from the action of the flowing fluid during the time that the valve is open.

Other objects and advantages of this invention will become apparent from the following description taken in connection with the accompanying drawing, it being understood that the same are by way of illustration and example only and not by way of limitation.

In the drawing:

Fig. 1 is a top elevation showing a valve constructed in accordance with this invention, the valve cover being removed and a part of the structure being broken away and shown in longitudinal cross section, the valve being in closed position.

Fig. 2 is a similar view showing the valve in open position.

Fig. 3 is a view similar to the central portions of Figs. 1 and 2, all parts being shown in elevation.

Fig. 4 is a view similar to Fig. 3 but illustrating the valve cover and stuffing box in place.

Fig. 5 is a transverse cross section of the structure shown in Fig. 4.

Referring now more particularly to the drawing, numeral 1 designates the valve body having two openings therefrom, one of which is the outlet and the other the inlet for the valve. One of these openings is shown in cross section in Figs. 1 and 2 and designated with the numeral 2. The ends of this body member are provided with flanges 3 and 4, respectively, for the purpose of connecting to the adjacent ends of a pipe or conduit, the flow through which is intended to be governed by this valve.

Intermediate its ends the body member is provided with a substantially cylindrical enlargement 5 closed at its lower end as shown at 6 in Fig. 5 and adapted to receive a carrier member or plug 7. This carrier member or plug has a reduced lower end portion 8 journalled within a socket 9 formed in the lower end of the cylindrical enlargement 5, and its upper end is reduced to form an elongated shaft 10 journalled at 11 within a cap 12. This cap 12 is secured to the upper end of the cylindrical enlargement 5 by means of screws 13 or the like, and is formed within its upper portion with a stuffing box 14 adapted to receive packing rings 15. These packing rings are compressed into sealing engagement with the shaft 10 and the interior of the stuffing box by means of a gland 16, this gland being urged to compress the packing rings 15 by means of studs 17 and nuts 18 thereon.

Referring again to the plug member 7, it is to be noted that this plug member does not fill the space within the cylindrical enlargement 5 and in fact does not itself contact the circumferential walls of this space. Instead, it is formed with a substantially square cross section as shown in Figs. 1, 2 and 3, and through this portion of squared cross section there is formed an opening 19 which when the plug is rotated may be brought into substantial alignment with the openings 2.

Carried by the plug 7 on the four sides of the squared portion just referred to are closure segments 20 and protective segments 21, respectively. The closure segments 20 are arranged opposite those sides of the plug 7 which are substantially parallel to the passage 19. These closure members are provided with seating surfaces 22 adapted to seat about the openings 2 when the plug 7 is turned to move the opening 19 out of alignment with the openings 2. The segments 20 are forced into this seating engagement by means of springs 23 and serve when in this position to shut off all flow through the valve. Each of the closure members 20 is provided with a lug 24 adjacent each end, this lug 24 having an inclined surface 25 adapted to receive a hook-shaped element 26 upon the plug 7. The opposite side of each of these lugs is provided with a flat end 27 adapted to receive an abutment 28 projecting from the plug 7.

It will readily be seen that when the plug is rotated in a clockwise direction as seen in Figs. 1, 2 and 3, the abutment 28 will contact the flat end of the closure segments at 27 and will move these segments along with the plug member without any substantial forces being exerted tending to move the segments either toward or away from the inner surface of the cylindrical enlargement 5. When the closure member 20 which will overlie the outlet of the valve moves to a position in front of that outlet, it will be acted upon in addition to the spring 23 by the pressure of the fluid, and this action will tend to firmly seat the closure member about the outlet opening. When flow has ceased and the pressure within the cylindrical enlargement 5 and within the inlet has equalized, the other spring 23 will cause the seating of the closure member against the inlet.

When the plug 7 is again turned in a counter-clockwise direction to move the closure elements from their position overlying the respective inlet and outlet openings, it would be an extremely difficult matter to move the plug and closure segments under high pressure because of the fluid pressure exerted under these conditions against that segment 20 which is seated about the outlet, were it not for the fact that the hook-shaped elements 26 upon the plug member will upon initial movement of the plug engage the inclined surfaces 25 upon the lugs 24 of the closure members 20 and move these closure members first radially away from their seats and then rotatably to a position such as shown in Fig. 2.

It will be appreciated that up to this point a complete valve has been described capable of closing off an opening to shut off or permit flow of fluid. However, in handling certain types of fluids great difficulties have been encountered as hereinbefore set forth because of the destructive action of the fluid and materials contained therein upon that portion of the cylindrical enlargement 5 against which the closure members 20 are adapted to seat when in closed position. This is for the reason that when in their open position as illustrated in Fig. 2, the closure members do not cover the surfaces against which they seat when in closed position and these surfaces are thereby subjected to the action of the fluid passing through the valve. In order to eliminate this difficulty the two sides of the squared plug 7 at the opposite ends of the opening 19 are provided with what will be termed protective segments or members 21. These members are similar to the closure members 20 except that they have openings 29 therethrough registering with and substantially the same size as the opening 19 and the openings 2. That portion of the protective segments 21 surrounding the openings 29 is adapted to seat against the same portion of the interior of the cylindrical enlargement 5 when the valve is open that the closure segment 20 is adapted to seat against when the valve is closed. These protective segments have lugs 30 at their ends seating between abutments 31 and 32 upon the plug 7 so that when the plug 7 is rotated in either direction the segments 21 will be move therewith. These segments are also pressed toward the interior surface of the enlarged cylindrical portion 5 by means of springs 33 similar in all respects to the springs 23 previously described.

In operation, the valve is connected by means of flanges 3 and 4 to the adjacent ends of a pipe or conduit through which the valve is adapted to control the flow. When the valve elements are in the position shown in Fig. 1, assuming that the flow is from the right as is illustrated, the pressure of the fluid will continually urge the left hand closure segment 20 into a position in which it will seat about the opening 2 which will be the outlet opening. This pressure of the fluid together with the spring 23 will cause this closure member to form a seal about this outlet and prevent the flow of any fluid through the valve. The corresponding surfaces adapted to contact each other and form a seal between the interior of the cylindrical member 5 and the exterior surface of the segment 20 are formed with a ground surface so as to form a fluid tight seal when they are brought together.

When it is desired to open the valve, the stem or shaft 10 and the plug 7 are rotated. The first result of this rotation is for the hooks 26, a part of which act on the left hand segment in the same manner as those acting on the right hand segment shown in Fig. 1, will first draw the closure segment 20 away from the opening in a substantially radial direction despite the pressure of the fluid thereagainst, and after the segment has been moved away from its seat, and the friction between the segment and its seat has been done away with, the segment will be moved to a position such as shown in Fig. 2, placing the opening 19 in communication with the openings 2 so as to permit flow through the valve. However, this same movement brings the protective segments 21 into the position shown in Fig. 2 wherein their respective openings are in alignment with the openings 19 and 2 and wherein the surfaces about these openings will seat against, cover, and protect the seating surfaces on the interior of the cylindrical member 5 against which the closure member seats when the valve is in closed position. It will readily be seen that under these circumstances no corrosive or other destructive effect can be had by the fluid upon this seat.

Furthermore, it will be seen that during all this time while the valve is open the seating surfaces on the closure segment 20 will likewise be seated against a blank portion of the interior of the cylindrical member 5 and will be protected against the action of the fluid.

It will thus be seen that a means has been provided for carrying out and accomplishing all the objects and advantages sought by this invention.

Having described my invention, I claim:

1. In a valve, a body member having inlet and outlet openings and a seat about one of said openings, a rotatable carrier mounted in said body and extending transversely of said body with respect to said inlet and outlet openings, a closure member mounted thereon and movable by rotation of said carrier to and from seated position against said seat, and a protective part movable to protect said seat when said closure member is moved away therefrom, said closure member and said protective part being separate from each other and floatingly mounted upon said carrier.

2. In a valve, a body member having inlet and outlet openings and a seat about one of said openings, a rotatable carrier in said body member, a closure member mounted on said rotatable carrier and movable by rotation of said carrier to and from seated position against said seat, said body member having a second seat for said closure member when said closure member is in open position, a protective part mounted on said carrier and movable to protect said first mentioned seat when said closure member is in open position, and a second protective part mounted on said carrier and movable to protect said second mentioned seat, when said closure member is in closed position.

3. In a valve, a body member having inlet and outlet openings and a seat about one of said openings, a rotatable carrier in said body, a closure member mounted on said rotatable carrier and movable by rotation of said carrier to and from seated position against said seat, a protective part mounted on said carrier and movable to protect said seat when said closure member is moved away therefrom, and resilient means for urging said closure member and said protective part against said seat.

4. In a valve, a body member having inlet and outlet openings and a seat about each of said openings, a rotatable carrier in said body, a separate closure member mounted on said rotatable carrier and movable by rotation of said carrier to and from seated position against each of said seats, a separate protective part mounted on said rotatable carrier and movable to protect each of said seats, respectively when said closure members are moved away therefrom, and resilient means for urging each of said closure members and each of said protective parts against said seats.

CHARLES F. JOHNSON.